United States Patent [19]

Spears

[11] 4,353,251

[45] Oct. 12, 1982

[54] MOUNTING APPARATUS FOR LIQUID FLOW METER

[75] Inventor: A. Barry Spears, Nashville, Tenn.

[73] Assignee: J. R. Wauford and Company, Consulting Engineers, Inc., Nashville, Tenn.

[21] Appl. No.: 238,473

[22] Filed: Feb. 26, 1981

[51] Int. Cl.³ .............................................. G01F 1/20
[52] U.S. Cl. ...................................................... 73/215
[58] Field of Search ................................ 73/215, 312

[56] References Cited

U.S. PATENT DOCUMENTS

| | | | |
|---|---|---|---|
| 802,901 | 10/1905 | Yabsley et al. | 73/215 |
| 1,078,669 | 11/1913 | Gamble | 73/215 |
| 1,159,150 | 11/1915 | Yarnall | 73/215 |

Primary Examiner—Herbert Goldstein
Attorney, Agent, or Firm—Harrington A. Lackey

[57] ABSTRACT

A mounting apparatus for a liquid flow meter adapted to be detachably mounted upon the top edge of a weir. The mounting apparatus includes a base plate supporting a clock-driven recording drum for rotary movement above the base plate and for supporting a stilling well below the base plate. A float shaft, having a float at its lower end within the stilling well, extends through the base plate for vertical reciprocal movement and supports a scribing tool above the base plate for scribing engagement with the recording drum. The recording drum, scribing tool and all other elements supported above the base plate are enclosed in a bell jar housing sealingly held against the top surface of the base plate to provide sufficient air pressure to limit the rise of any liquid within the bell jar housing. The bottom surface of the base plate also supports a plurality of magnets for engaging a ferromagnetic surface fixed to the top edge portion of a weir for securing the mounting apparatus in a stable position upon the weir. A magnetic release mechanism is provided in the form of an elongated handle member having an arm pivotally mounted upon the base plate and having a free end adapted to cam against the ferromagnetic surface to force the magnets and the base plate away from magnetic engagement with the ferromagnetic surface, so the device can be easily removed from the weir.

10 Claims, 4 Drawing Figures

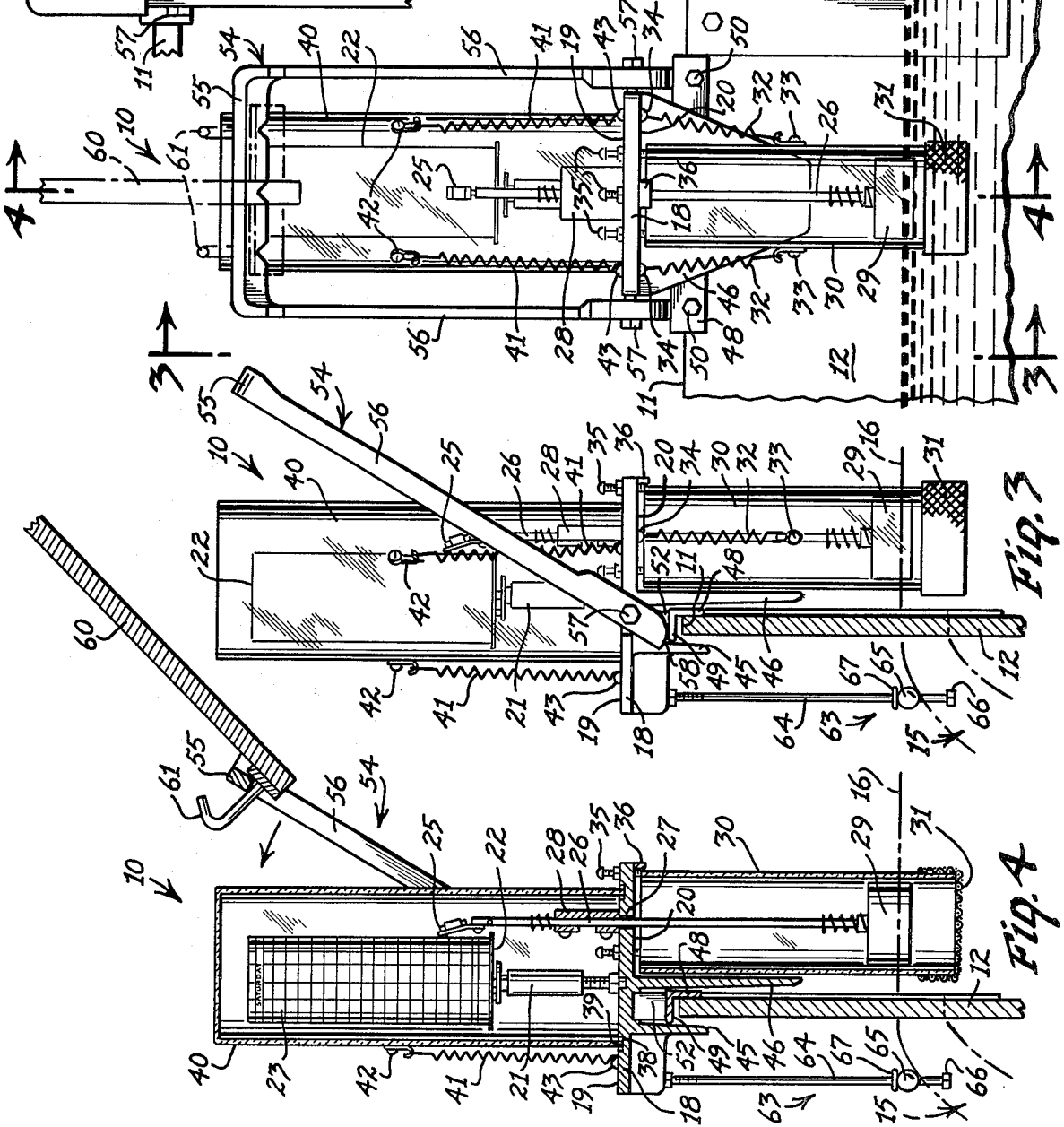

MOUNTING APPARATUS FOR LIQUID FLOW METER

BACKGROUND OF THE INVENTION

This invention relates to liquid flow meters, an more particularly to apparatus for mounting a liquid flow meter upon a weir.

Liquid flow meters for mounting on weirs and incorporating a float-responsive scribing tool for recording the changes in liquid flow level upon a clock-driven recording cylinder, are well known in the art. Such liquid flow meters are illustrated in the following U.S. Patents:

U.S. Pat. No. 815,102; Lea; Mar. 13, 1906;
U.S. Pat. No. 871,093; Eisenhut; Nov. 12, 1907;
U.S. Pat. No. 996,546; Watson; June 27, 1911;
U.S. Pat. No. 1,015,556; Gibson; Jan. 23, 1912.

The above Lea, Eisenhut and Gibson patents also disclose upright cylindrical chambers for receiving the vertically movable float, to function as stilling wells.

Page 1, lines 42–46 of the above Eisenhut patent also discloses that it is old to mount upon the recording drum a paper chart having lines which may be calibrated in gallons.

The Watson Patent also discloses a case for enclosing the rotary recording drum and the upper portion of the float rod and scribing tool.

However, none of the above patents disclose an apparatus for mounting a liquid flow meter for detachable, but secure, engagement on top of a weir in a remote or substantially inaccessible position, such as in a subterranean sewer line beneath a manhole, much less the means for releasing the meter from the weir and for retrieving the meter from the inaccessible location.

Moreover, none of the above patents disclose such a detachable mounting apparatus for support upon a weir in a substantially inaccessible location in which the recording drum and scribing tool are substantially protected from rising liquid humidity, corrosive gases, and other foreign contaminants, located in the highly exposed, substantially inaccessible position on the weir.

Leaking sewer systems are one of the most serious problems faced by local municipalities as well as by corresponding state and federal regulatory agencies, and constitutes a serious threat to the environment. In order to assess the condition of a sewer system, it must be sub-divided into small drainage areas and subjected to measurement by liquid flow meters under various weather conditions. These liquid flow meters must be mounted upon weirs in the path of the subterranean sewage flow and must be transported to the weirs and removed therefrom through manholes. Such flow meters must be extremely reliable to accommodate the various weather conditions, normally for periods of a week at a time when the meters are read. The integrity and reliability of the instrumentation as well as the mounting device for the meters must be maintained while unattended in substantially inaccessible locations in hostile environments and subjected to extreme vagaries of weather conditions.

SUMMARY OF THE INVENTION

It is therefore an object of this invention to provide a mounting apparatus for a liquid flow meter which is adapted to be stably mounted upon a weir, particularly in sewage flow channels in relatively inaccessible and subterranean areas, such as through manholes, and yet be readily removable.

The mounting apparatus for a liquid flow meter made in accordance with this invention includes a rigid base plate upon the top surface of which is supported an encapsulating bell jar housing enclosing a clock-driven rotary recording drum and the upper end portion of the float shaft supporting a scribing tool. Depending from the bottom surface of the base plate is a cylindrical stilling well for receiving the float and the lower portion of the float shaft. The bell jar housing protects the sensitive instrumentation from the surrounding atmosphere as well as providing a pressurized air bubble for resisting rising water within the housing. Turbulence from the liquid flow is minimized within the stilling well, in which the liquid level rises and falls with the level of liquid flowing through the discharge opening of the weir.

Attached to the bottom surface of the base plate are a plurality of magnet members, such as permanent magnets, for magnetically engaging a horizontal elongated magnetic surface fixed to the top edge of the weir, to provide a stable and secure mounting for the meter upon the weir even when subjected to turbulent liquid flow.

An elongated U-shaped handle having a pair of elongated arms pivotally mounted about horizontal axes to opposite sides of the base plate has free cam-shaped adapted to engage the surfaces and force the base plate upward and away from the weir when the handle is rotated to an upward disengaging position. The elongated handle may be manipulated from a remote location by an elongated hook-shaped member, to disengage the meter from the weir and to remove the meter from the weir.

The bottom surface of the base plate is also provided with a pair of spaced flanges adapted to straddle the top edge of the weir in order to provide additional stability for the base plate.

In a preferred form of the invention, a downstream level monitor in the form of a steel rod depending from the base plate and having a slidable magnetic marker urged upward by a float slidable on the rod and responsive to the liquid level on the downstream side of the weir, functions as an indicator of the "high-water" mark of the downstream liquid level. Indication of the downstream level is important in assessing the validity of the recorded information on the graph paper on the recording drum.

The bell jar housing is provided with means for not only holding the housing down in sealing engagement with the top surface of the base plate, but also with means for readily detaching the housing when the meter is removed for retrieving the inscribed graph paper and for replacing the same.

BRIEF DESCRIPTION OF THE DRAWINGS

FIG. 1 is a rear elevational view of the flow meter mounting apparatus, made in accordance with this invention, shown in operative position mounted upon a weir, shown fragmentarily, and disclosing a retriever rod fragmentarily in phantom;

FIG. 2 is a top plan view of the device, with the weir disclosed fragmentarily;

FIG. 3 is a side elevational view of the device taken along the line 3—3 of FIG. 1, with the weir in section, and with the retriever rod removed; and FIG. 4 is a sectional elevation taken along the line 4—4 of FIG. 1, with the retreiver rod shown fragmentarily in operative position.

DESCRIPTION OF THE PREFERRED EMBODIMENTS

Referring now to the drawings in more detail, the flow meter mounting apparatus or device 10 made in accordance with this invention is designed to be mounted upon the top edge or surface 11 of the vertical wall or barrier 12 of a weir 13 having a weir discharge opening 14. The weir 13 is located transversely of the flow path of the liquid stream, such as the sewage flow through an underground storm sewer or sewer channel. The weir 13 is usually mounted in the path of sewerage flow below a manhole, for convenience in installation, removal, meter observation, and maintenance. The flow meter device 10 is designed to measure the level 16 of the liquid stream 15.

The mounting apparatus 10 includes a substantially flat base plate 18 adapted to be supported in a horizontal position upon the top edge 11 of the wall 12, and having a top surface 19 and a bottom surface 20.

Threadedly fixed into the top surface 19 of the base plate 18 is a vertically extending spindle 21 supporting for rotary movement a clock-driven recording drum 22, upon which is mounted a cylindrical sheet of recording or graph paper 23, preferably calibrated to read the metered results in gallons per minute.

A scribing tool or pen 25 mounted on top of a float shaft 26 is adapted to engage the graph paper 23, and inscribe on the graph paper 23 as the recording drum 22 is rotating at a uniform speed and as the float shaft 26 moves vertically. The graph paper may be designed to record the liquid level information continuously for a period, such as a week, after which the graph paper is replaced for subsequent weekly recordings.

The float shaft 26 extends through a hole 27 in the base plate 18 and is guided for free vertical reciprocable movement in a low-friction bushing 28 fixed to the top surface 19 of the base plate 18. The float shaft 26 is preferably of square cross-section, as is the corresponding hole 27, to prevent rotary movement of the float shaft 26 as it reciprocates through the hole 27.

The bottom of the float shaft 26 terminates is an enlarged float 29, preferably made of a urethane foam or any other suitable buoyant material, for floating upon the liquid surface 16.

Surrounding the float 29 and the lower portion of the float shaft 26, in vertical coaxial alignment, is a stilling well 30 in the form of a transparent cylinder having open upper and lower ends. However, the lower end of the cylindrical stilling well 30 is covered by a porous screen member 31 to permit free communication of liquid between the interior of the stilling well 30 and the body of the stream 15, yet prevent any unwanted solid particles from entering the interior of the stilling well 30 to interfere with the operation of the float 29.

The stilling well 30 is held in position beneath the base plate 18 by a pair of elongated elastic hold-down members, such as the hold-down springs 32. The lower ends of the springs 32 are secured to the outer wall of the stilling well 30 by detachable hook fasteners 33, while the upper ends of the holddown springs are secured to the bottom surface 20 by suitable fasteners 34.

Three set screws 35 are threaded downwardly through the base plate 18, each of which is in vertical alignment with a portion of the cylindrical wall of the stilling well 30. Thus, by adjusting the set screws 35, the stilling well 30 can be finely adjusted to a position truly coaxial with the vertical axis of the float shaft 26. One or more depending flanges 36 may also be provided to laterally or transversely locate the position of the stilling well 30.

Seated within a circumferential groove 38 in the top surface 19 of the base plate 18 is the bottom edge 39 of an open-ended inverted bell jar housing 40. The interior of the bell jar housing 40 is large enough to receive and more or less encapsulate the clock-driven recording drum 23, spindle 21, scribing tool 25, bushing 28 and the upper portion of the float shaft 26 above the base plate 18. A plurality (three of which are shown in the drawings) of elongated elastic hold-down members, such as the hold-down springs 41, are secured at their upper ends by detachable hook fasteners 42 to the side wall of the bell jar housing 40. The lower ends of the hold-down springs 41 are secured by suitable fasteners 43 to the top surface 19 of the base plate 18.

The bell jar housing 40 is preferably cylindrical and made of transparent material, such as "Plexiglass," so that the interior of the housing may be observed for reading the recorded data on the graph paper 23 and also for observing the operativeness and conditions of the recording drum 22 and the scribing tool 25.

Depending from the bottom surface 20 of the base plate 18 is a pair of parallel flanges or fins 45 and 46 spaced just far enough apart to fit over and receive the top edge 11 of the wall 12. The flanges 45 and 46 depend far enough down to prevent the base plate 18 and all its supported elements from tipping over, even when acted upon by external environmental forces, such as a turbulent stream 15.

Since flange 46 is closer to the center of gravity of the device 10 than the flange 45 and is on the upstream side of the weir wall 12, the flange 46 depends substantially below the flange 45 to counteract tipping of the device 10 in the more prevalent clockwise direction as viewed in FIGS. 3 and 4. Accordingly flange 46 functions as a stabilizing flange.

In order to secure the base plate 18 to the weir wall 12, an elongated member having a magnetic or ferromagnetic surface, specifically in the form of an elongated angle iron 48, is fixedly secured to the wall 12 so that the top horizontal flange 49 of the angle iron 48 will extend horizontally along and parallel to the top edge 11, to constitute an elongated magnetic plate or armature. The angle iron 48 is secured to the wall 12 by fasteners, such as bolts 50. Although the drawings disclose the magnetic flange 49 spaced above the top edge 11, the flange 49 may be seated flush against the top edge 11, if desired.

Fixed to the bottom surface 20 of the base plate 18 in the recess formed between the flanges 45 and 46 is a magnetic member, such as the plurality of transversely spaced discrete permanent magnets, preferably ceramic magnets 52. The bottom surfaces of the magnets 52 are disposed in a horizontal plane so that they may all bear evenly upon the top surfaces of the horizontal magnetic flange 49. Thus, when the device 10 is seated in operative position, as disclosed in the drawings, the magnets 52 magnetically secure the device 10 upon the weir wall 12. Furthermore, the device 10 is stabilized against cantilevered or tipping movement by the depending spaced flanges 45 and 46.

The stabilizing flange 46 also functions to assist in locating the stilling well 30.

A U-shaped handle member 54 having a transverse bight member 55, and a pair of depending elongated arms 56, transversely straddles the base plate 18. The arms 56 are secured to the opposite edges of the base plate 18 by a pair of shoulder bolts 57 to permit pivotal movement of the handle member 54 about the horizontal transverse axes of the shoulder bolts 57.

The lower ends of both arms 56 form arcuate cam surfaces 58 for camming engagement with the top surfaces of the magnetic flange 49. The distance between the pivotal axes of the bolts 57 and the arcuate cam surfaces 58 is greater than the distance between the bolt axes 57 and the top surface of the magnetic flange 49. Thus, when the handle member 54 is rotated counter-clockwise, as illustrated in FIGS. 3 and 4, the cam ends 58 bearing against the horizontal flange 49 will force upward the base plate 18 to separate the magneic engagement between the magnets 52 and the magnetic flange 49, in order to facilitate the removal of the device 10 from the weir wall 12. After the magnetic engagement is broken, then the handle member 54 may be utilized to lift the device free of the wall 12.

Where the device 10 is mounted upon a weir 13 within a subterranean sewer channel, for example, in a remote position below a manhole, an elongated retriever rod 60 having hooks 61 at its lower end, may be utilized for engaging the bight member 55 of the handle member 54 in order to pivot the handle member 54 about the axes of the shoulder bolts 57 and also to lift the handle member 54 and the device 10 upward from the weir 13. In this manner, the meter mounting device 10 may be lowered through a manhole for installation or mounting upon the weir 13 in a sewer channel, and in the same manner removed from the weir, without the necessity of the operator descending into the sewer channel through the manhole, himself.

Moreover, the magnetic devices 52 and 49 provide a very stable mounting mechanism for holding the device 10 in its operative position while metering the flow and volume of the stream 15, even in a hostile environment, such as turbulent flow.

After the device 10 is retrieved from a weir 13, it may be checked for defects or damage, as well as for reading the recordal data, for replacing the graph paper 23, for cleaning or any other type of maintenance desired, merely by quickly releasing hook-fasteners 42 of the hold-down spring members 41, and lifting the ball jar housing 40.

The bell jar housing 40 is preferably cylindrical and the groove 38 in which its bottom edge 39 is received is circular of the same diameter as the cylindrical housing 40. The drum 22, pen 25, and graph paper 23 are located at a substantially spaced distance above the top surface 19 so that in the event the liquid level 16 rises to completely or partially cover the cylinder housing 40, then any liquid which might seep through the groove 38 into the interior of the housing 40 will be retained at a substantially lower level than the level of the risen stream 15 by the air bubble trapped within the cylinder 40. Accordingly, no liquid will rise high enough to damage the operating parts of the meter instrumentation or graph paper 23. In the preferred form of the invention, the pen, drum and graph paper are located at least 4½ inches above the top surface 19 so that these elements are safe from liquid damage, unless the flow level 16 rises to at least 12 feet above the top of the cylinder 40. In the above described example, the vertical scribing range of the pen 25 would be approximately 10 inches.

In order to validate the recorded indicia on the graph paper 23, it is necessary to know the maximum height of the downstream level of the stream during a recorded period. In order to record such information, a downstream level monitor 63 is provided. This monitor 63 includes a ferromagnetic rod, such as a steel rod 64, fixed to and depending from the front portion of the base plate 18. A small monitor float 65 is slidably mounted for free vertical movement upon the steel rod 64. A stop 66 is attached to the bottom end of the steel rod 64 to prevent the float 64 from falling off the rod. Slidably mounted on the steel rod 64 above the float 64 is a magnetic marker in the form of a magnetic ring 67 which is urged upward by the rising float 65 and is retained in its uppermost position by the magnetic attraction of the ring 67 to the steel rod 64. Thus, the "high-water mark" of the downstream side of the liquid laterally adjacent the stream 15 can be easily read by the position of the magnetic ring 67 on the steel rod 64 when the operator comes to observe or retrieve the device 10. If the "high-water mark" of the downstream liquid is excessive, it indicates a back-up condition which renders the reading on the graph paper invalid.

What is claimed is:

1. A mounting apparatus for a liquid flow meter for support upon a weir having a top edge, comprising:
   (a) a base plate having a top surface and a bottom surface,
   (b) a clock-driven recording drum rotatably supported on the top surface of said base plate,
   (c) a stilling well mounted beneath and depending from the bottom surface of said base plate,
   (d) a float shaft mounted for free vertical movement through said base plate in said stilling well and above said base plate,
   (e) a float on said float shaft for vertical movement in said stilling well in response to the liquid level within said stilling well,
   (f) a scribing tool mounted on said float shaft adapted to engage said recording drum for scribing thereon,
   (g) a magnetic surface on the top edge of the weir, and
   (h) a magnetic member fixed to the bottom surface of said base plate for magnetic engagement with said magnetic surface to hold said base plate stationary upon the top edge of the weir.

2. The invention according to claim 1 further comprising means for releasing the magnetic engagement between said magnetic member and said magnetic surface.

3. The invention according to claim 2 in which said releasing means comprises an elongated handle member having at least one elongated arm member having a free end, journal means pivotally mounting said arm member adjacent said free end to said base plate for retary movement about a horizontal axis, so that rotary movement of said handle member about said pivotal axis will cause said free end to engage said magnetic surface and force said base plate away from said magnetic surface.

4. The invention according to claim 3 in which said free end has an arcuate cam surface eccentric about said pivotal axis.

5. The invention according to claim 3 in which said handle member is U-shaped comprising two of said arm members straddling said base plate, said journal means pivotally supporting both said arm members to opposite sides of said base plate and said magnetic surface extending transversely beneath said base plate for engagement by the free ends of said arm members, in releasing position.

6. The invention according to claim 5 further comprising an elongated hook member adapted to detachably engage said U-shaped handle member for rotating said handle member about said journal axes to release said magnetic engagement and to lift the mounting apparatus from the weir.

7. The invention according to claim 1 in which said magnetic member comprises a plurality of permanent magnets mounted in spaced relationship on the bottom surface of said base plate, said magnets being adapted to seat upon said magnetic surface to hold said base plate in a substantially horizontal plane.

8. The invention according to claim 1 further comprising a bell jar housing having an open bottom end and adapted to fit over and receive said clock-driven recording drum, said float shaft and said scribing tool, and detachable means holding said bell jar housing down in sealed engagement upon the top surface of said base plate enclosing said recording drum, said float shaft and said scribing tool.

9. The invention according to claim 8 in which said means for holding down said bell jar housing comprises a plurality of circumferentially spaced hold-down spring members detachably secured to said housing and said base plate.

10. The invention according to claim 1 further comprising a downstream level monitor comprising an elongated ferromagnetic rod fixed to and depending from said base plate on the downstream side of the weir when said mounting apparatus is supported upon the weir, a float member freely slidable vertically on said rod and a magnetic marker member vertically slidable on said rod above said float member, said magnetic marker magnetically engaging said rod in its uppermost position urged by said float member.

* * * * *